US008058175B2

(12) United States Patent
Huang et al.

(10) Patent No.: US 8,058,175 B2
(45) Date of Patent: Nov. 15, 2011

(54) METHOD FOR PLANARIZATION OF WAFER AND METHOD FOR FORMATION OF ISOLATION STRUCTURE IN TOP METAL LAYER

(75) Inventors: Herb He Huang, Shanghai (CN); Xianyong Pu, Shanghai (CN); Yi'nan Han, Shanghai (CN); Yiqun Chen, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 763 days.

(21) Appl. No.: 11/852,918

(22) Filed: Sep. 10, 2007

(65) Prior Publication Data
US 2008/0081478 A1    Apr. 3, 2008

(30) Foreign Application Priority Data
Sep. 30, 2006 (CN) .......................... 2006 1 0116853

(51) Int. Cl.
*H01L 21/311* (2006.01)
*H01B 13/00* (2006.01)
*C30B 33/00* (2006.01)
*B44C 1/22* (2006.01)

(52) U.S. Cl. ........ 438/697; 438/694; 438/698; 438/700; 216/19; 216/23; 216/38; 216/39

(58) Field of Classification Search .................. 216/41, 216/52, 58; 438/694, 706, 424, 704, 734, 438/692, 633, 697, 687, 631, 672, 638, 668, 438/698, 700; 257/E21.241; 148/DIG. 50, 148/DIG. 51
See application file for complete search history.

(56) References Cited

U.S. PATENT DOCUMENTS

| 4,836,885 | A | * | 6/1989 | Breiten et al. ................ 438/427 |
| 5,175,122 | A | | 12/1992 | Wang et al. |
| 5,609,775 | A | * | 3/1997 | Liu ............................... 438/625 |
| 6,093,656 | A | | 7/2000 | Lin |
| 6,121,151 | A | * | 9/2000 | Chen ............................. 438/692 |
| 6,376,361 | B1 | * | 4/2002 | Chooi et al. .................. 438/631 |
| 6,884,729 | B2 | * | 4/2005 | Lee et al. ...................... 438/704 |
| 2004/0053466 | A1 | * | 3/2004 | Mikawa et al. ............... 438/253 |
| 2004/0266209 | A1 | * | 12/2004 | Hinode et al. ................ 438/737 |

OTHER PUBLICATIONS

Chinese Office Action of related application mailed Jul. 18, 2008, 11 pgs. without translation.

* cited by examiner

*Primary Examiner* — Parviz Hassanzadeh
*Assistant Examiner* — Margaret D Klunk
(74) *Attorney, Agent, or Firm* — Squire, Sanders & Dempsey (US) LLP (57) ABSTRACT

The invention discloses a planarization method for a wafer having a surface layer with a recess, comprises: forming an etching-resist layer on the surface layer to fill the entire recess; etching the etching-resist layer and the surface layer, till the surface layer outside the recess is flush to or lower than the bottom of the recess, the etching speed of the surface layer being higher than that of the etching-resist layer; removing the etching-resist layer; and etching the surface layer to a predetermined depth. The method can avoid concentric ring recesses on the surface of the wafer resulted from a chemical mechanical polishing (CMP) process in the prior art, and can be used to obtain a wafer surface suitable for optical applications.

19 Claims, 11 Drawing Sheets

METHOD FOR PLANARIZATION OF WAFER AND METHOD FOR FORMATION OF ISOLATION STRUCTURE IN TOP METAL LAYER

This application claims the priority of Chinese Patent Application No. 200610116853.7, filed Sep. 30, 2006, the entire disclosure of which is incorporated herein by reference.

FIELD OF THE INVENTION

The present invention relates to a planarization process in semiconductor manufacturing, particularly to a method for planarization of a wafer and a method for forming an isolation structure in a top metal layer in Liquid Crystal on Silicon (LCOS) technique.

BACKGROUND OF THE INVENTION

With the rapid development of Ultra Large Scale Integration (ULSI) technique, integrated circuits (ICs) manufacturing techniques become more and more complex and precise. In order to improve an integration degree and reduce a manufacturing cost of a device, the Feature Size of components becomes smaller and smaller, and the number of components per unit area in a chip becomes higher and higher. Therefore, it is difficult to meet the requirement for intense distribution of components by single-layer routing; multi-layer routing technique has been employed to utilize vertical space in a chip so as to further improve the integration degree of device. However, the multi-layer metallization results in unevenness on the surface of the wafer and is severely disadvantage for patterning. In order to implement a multi-layer metallization structure on a wafer with a large diameter, it is required to achieve a good overall flatness on each layer in the wafer, i.e., it is required a planarization process for a layer, such as conductor, ILD (Inter-Layer Dielectric), metal (e.g., W, Cu, Al) silicon oxide, and nitride etc., in the multi-layer interconnection structure.

Now, Chemical Mechanical Polishing (CMP) is a commonly planarization method in wafer planarization process; however, latest investigations show that, the wafer surface flatness achieved by a conventional CMP can't meet the requirement for some applications, such as an application in optical instruments, an application in image transmission or image processing components and other products with a high requirement for surface quality, and the yield of the products is very low, due to the extremely high requirement for wafer surface flatness.

Figure 1A:
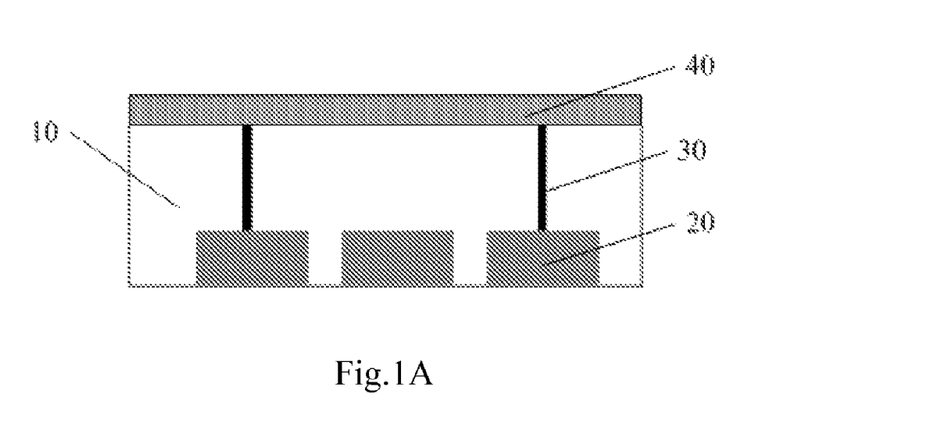
FIG. 1A-1E are schematic cross-section diagrams of a wafer during a planarization process for a top metal layer in LCOS in the prior art.
Figure 1B:
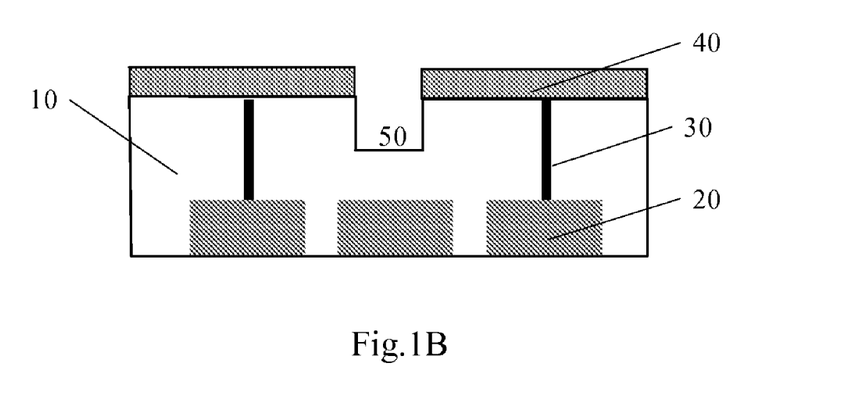
Figure 1C:
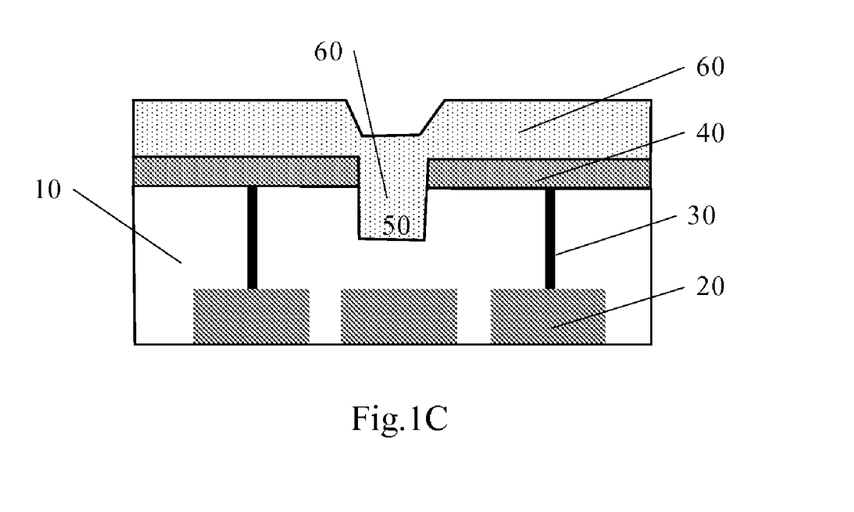
Figure 1D:
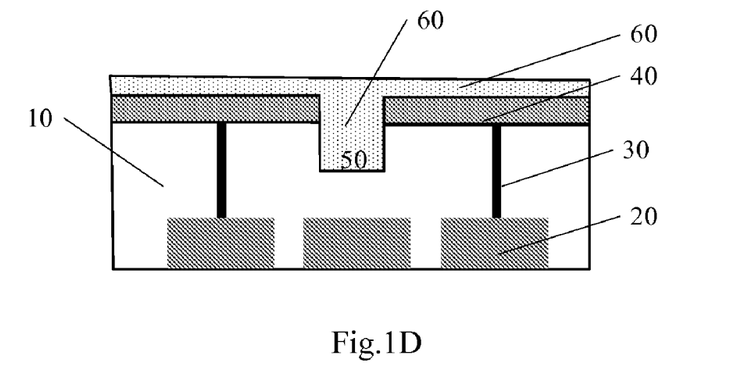
Figure 1E:
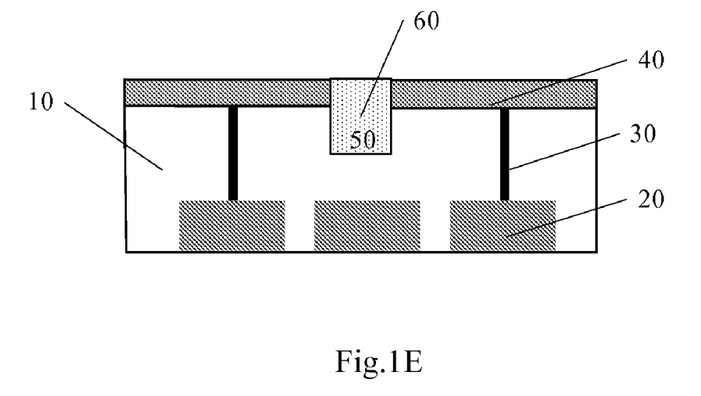
Figure 2:
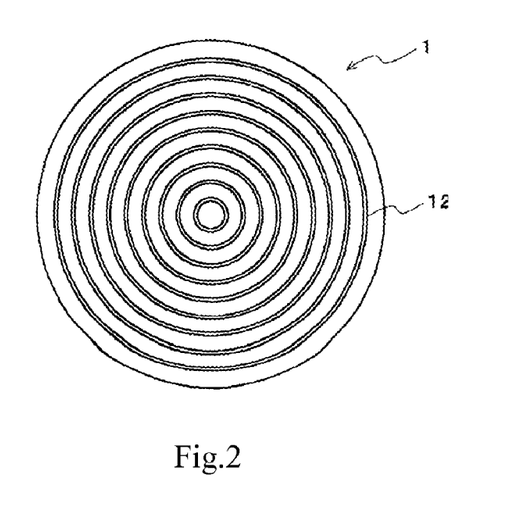
FIG. 2 is a schematic diagram of the surface of the top metal layer after the planarization process in LCOS in the prior art.

For example, during the planarization for a top metal layer in Liquid Crystal on Silicon (LCOS) technique, the top metal layer 40 needs to be divided into several small mirrors, as shown in FIG. 1A, in which reference number 10 represents the ILD layer, reference number 20 represents the intermediate metal layer, reference number 30 represents the contact hole metal, and reference number 40 represents the top metal layer. Therefore, as shown in FIG. 1B, the top metal layer 40 and the ILD layer 10 are etched to a certain depth to form a trench 50; then, as shown in FIG. 1C, an insulating oxide layer 60 is deposited over the trench 50 and the top metal layer 40 to fill the trench 50; next, as shown in FIG. 1D, the insulating oxide layer 60 over the top metal layer 40 is polished by a CMP process; finally, the entire insulating oxide layer 60 on the top metal layer 40 is removed by a dry etching process to form a structure as shown in FIG. 1E. However, by means of a microscopic surface analysis, it is found that the top metal layer 40 formed by the above method has concentric ring recesses on the surface, as shown in FIG. 2, which causes the top metal layer 40 unable to be used as the mirror of LCOS.

Figure 3:
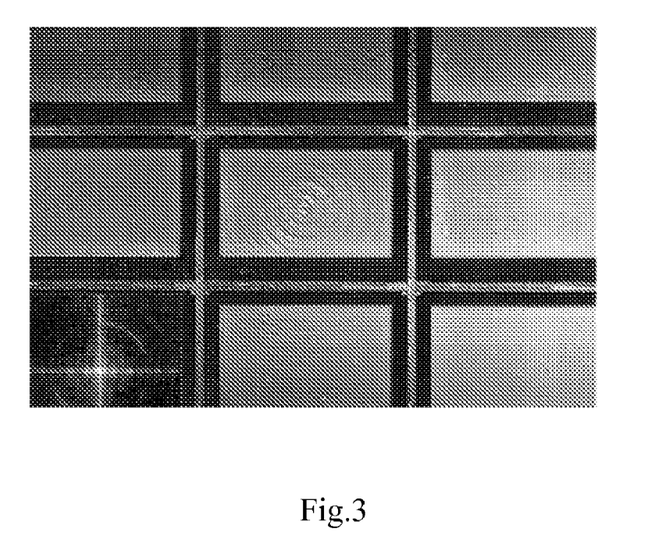
FIG. 3 is a schematic diagram of a surface of the polishing pad used in CMP in the prior art.

Further investigation shows that the concentric ring recesses on the top metal layer 40 is caused by concentric ring recesses on the surface of the polishing pad used in conventional CMP technique. For example, in a polishing pad structure described in China Patent Application CN03140681, a surface of the polishing pad has grid, ring, or helix recesses, as shown in FIG. 3. Since the surfaces of the polishing pads have recesses, the recesses similar to that in the polishing surface will be formed on the surface of the top metal layer 40 during CMP process, hence, degrading surface flatness of the top metal layer 40.

SUMMARY OF THE INVENTION

The main object of the present invention is to solve a problem of a poor wafer surface quality after a planarization process by CMP in the prior art.

To solve the above problem, the present invention provides a method for planarization of a wafer having a surface layer with recesses, comprising:

forming an etching-resist layer on the surface layer to fill the recess, a thickness of the etching-resist layer in the recess being larger than that outside the recess;

etching the etching-resist layer and the surface layer; wherein, an etching speed of the surface layer is higher than that of the etching-resist layer, so that the portions outside the recess will not be higher than the bottom of recess after the etching;

removing the etching-resist layer in the recess.

Wherein, if the etching-resist layer is a photoresist (PR) layer, the method further comprises a process of patterning the PR layer after the PR layer is formed on the surface layer and before the etching-resist layer and the surface layer are etched, so as to remove PR layer outside the recess. Or, the etching-resist layer may be a BARC (Bottom Anti-Reflection Coat) layer.

Wherein, the etching-resist layer is formed by spin-coating process.

Wherein, the surface layer is made of one selected from a group consisting of silicon oxide, silicon nitride and aluminum (Al).

Wherein, the etching-resist layer and the surface layer are etched by a dry etching process.

If a surface to be etched is silicon oxide or silicon nitride, the main etching gas for etching the etching-resist layer and the surface layer includes at least one of $C_xF_y$ ($1 \leq X \leq 9$, $1 \leq Y \leq 9$) and $CH_xF_y$ ($1 \leq X \leq 9$, $1 \leq Y \leq 9$). If the surface to be etched is Al, the etching gas for etching the etching-resist layer and the surface layer comprises an etching gas containing halogen family elements.

Wherein, the etching-resist layer is removed by an ashing process.

The present invention also provides a method for planarization of a top metal layer on which an insulating oxide layer having recesses is formed, comprising:

forming an etching-resist layer over the insulating oxide layer to fill the recess, the thickness of the etching-resist layer on the insulating oxide layer in the recess being larger than that outside the recess;

etching the etching-resist layer and the insulating oxide layer, wherein, the etching speed of the insulating oxide layer is higher than that of the etching-resist layer, so that the insulating oxide layer outside the recess in not higher than the bottom of the recess;

removing the etching-resist layer on the insulating oxide layer in the recess; and etching the insulating oxide layer, till the top metal layer is exposed completely.

Wherein, if the etching-resist layer is a PR layer, the method further comprises a process of patterning the PR layer after the PR layer is formed on the insulating oxide layer and before the PR layer and the insulating oxide layer are etched, so as to remove the PR layer outside the recess on the insulating oxide layer. The etching-resist layer may be a BARC layer.

Wherein, the etching-resist layer is formed by a spin-coating process.

Wherein, the insulating oxide layer is made of one selected from a group consisting of silicon oxide, oxynitride, TEOS (tetraethyl orthosilicate), and ONO (oxide-nitride-oxide).

The main etching gas for etching the etching-resist layer and the insulating oxide layer includes at least one of CxFy ($1 \leq X \leq 9$, $1 \leq Y \leq 9$) and CHxFy ($1 \leq X \leq 9$, $1 \leq Y \leq 9$).

Wherein, the etching-resisting layer is removed by an ashing process.

Wherein, the top metal layer is an Al layer.

Wherein, the insulating oxide layer is etched till the top metal layer is exposed completely by a dry etching process.

The present invention also provides a method of isolating a top metal layer for a wafer having an ILD layer and the top metal layer on the ILD layer, comprising:

etching the top metal layer and the ILD layer to a predetermined depth, to form a trench in the top metal layer and the ILD layer;

forming an insulating oxide layer over the top metal layer and the trench to fill the trench so that the insulating oxide layer has a recess at a position corresponding to the trench;

forming an etching-resist layer over the insulating oxide layer to fill the recess, the thickness of the etching-resist layer in the recess being larger than that outside the recess;

etching the etching-resist layer and the insulating oxide layer, wherein, the etching speed of the insulating oxide layer is higher than that of the etching-resist layer, so that the insulating oxide layer outside the recess will not be higher than the bottom of the recess;

removing the etching-resist layer in the recess; and etching the insulating oxide layer, till the top metal layer is exposed completely.

Wherein, if the etching-resist layer is a PR layer, the method further comprises a process of patterning the PR layer after the PR layer is formed over the insulating oxide layer and before the PR layer and the insulating oxide layer are etched, so as to remove the PR layer outside the recess. Or, the etching-resist layer may be a BARC layer.

Wherein, the etching-resist layer is formed by a spin-coating process.

Wherein, the insulating oxide layer is made of one selected from a group consisting of silicon oxide, oxynitride, TEOS and ONO.

The etching gas for etching the etching-resist layer and the top metal layer includes at least one of CxFy ($1 \leq X \leq 9$, $1 \leq Y \leq 9$) and CHxFy ($1 \leq X \leq 9$, $1 \leq Y \leq 9$).

Wherein, the etching-resist layer is removed by an ashing process.

Wherein, the top metal layer is an Al layer.

Wherein, the insulating oxide layer is etched till the top metal layer is exposed completely by a dry etching.

Wherein, the ILD layer is made of one selected from a group consisting of silicon oxide, oxynitride, TEOS, ONO and any other insulating dielectric material with a higher K-value than silicon oxide.

The present invention has the following advantages over the prior art:

1. In the method for wafer planarization provided in the present invention, an etching-resist layer is formed over the recesses of wafer; then, the wafer and the etching-resist layer are etched; since the etching speed of the etching-resist layer is lower than that of the wafer surface, the etching-resist layer is removed when the wafer surface outside the recess is etched to flush to or lower than the bottom of the recess; and then the wafer surface is further etched to the predetermined depth. The CMP process can be avoided by the above method, and thereby concentric ring recesses on wafer surface resulted from CMP can be avoided. Furthermore, since an etching-resist layer is formed over the wafer to cover the recess, the recess is not etched while the wafer surface outside the recess is etched. When the wafer surface outside the recess is etched to flush to or lower than the bottom of the recess, the etching-resist layer can be removed so that the entire wafer surface will be formed nearly in a plane. Moreover, the wafer surface flatness can be ensured after the wafer surface is further etched to a predetermined depth.

2. The method for top metal layer planarization in LCOS technique employs an etching process for the top metal layer planarization and thereby avoids concentric ring recesses on the top metal layer caused by CMP. Therefore, a high-quality top metal layer can be obtained, and the display quality of a LCOS LCD can be improved.

3. The present invention also provides a method for isolating a top metal layer in LCOS, which can effectively isolate the top metal layer into several mirrors. Since an etching process is used for planarization of the top metal layer, the surfaces of the mirrors are highly flat.

4. The present invention employs a PR or BARC layer as the etching-resist layer; due to patterning capability of PR or the half-fluidity of BARC, the recesses described in the present invention can be filled completely, so that a flat wafer surface can be obtained. Therefore, the wafer surface still maintains flat after the dry etching or wet etching process.

BRIEF DESCRIPTION OF THE DRAWINGS

The above and other objects, features and other advantages of the present invention will be more clearly understood from the following detailed description taken in conjunction with the accompanying drawings. The drawings are not drawn to scale for the purpose of illustrating the spirit of the present invention. In the drawings, the thicknesses of layers and the area of regions are amplified for clearness.

DETAILED DESCRIPTION OF THE INVENTION

The above and other objects, features and other advantages of the present invention will be more clearly understood from the following detailed description taken in conjunction with the accompanying drawings.

Embodiment 1

The present invention provides a method for planarization of a wafer having a surface layer with recesses, comprising: forming an etching-resist layer on the surface layer to fill the recess and the thickness of the etching-resist layer in the recess is larger than that outside the recess; etching the etching-resist layer and the surface layer; wherein, the etching speed of the surface layer is higher than that of the etching-resist layer, so that the portions of the surface layer outside the recess will not be higher than the bottom of recess after etching; and removing the etching-resist layer.

Figure 4A:
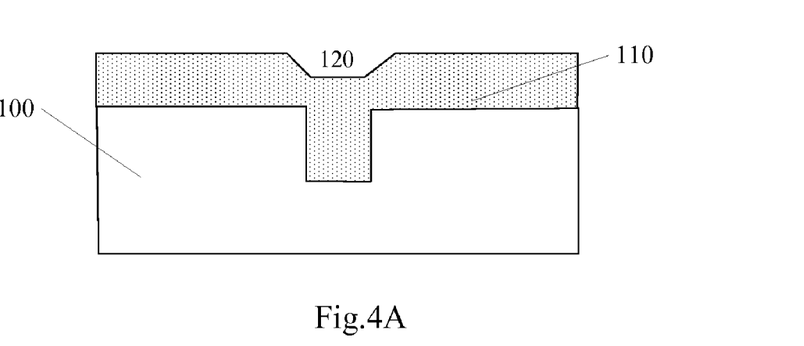
FIG. 4A-4D are schematic cross-section diagrams of the wafer during a planarization process according to the method provided in the present invention.

As shown in FIG. 4A, a wafer having a semiconductor substrate 100 is provided; the semiconductor substrate 100 may be applied to semiconductor manufacturing processes, and may have devices and circuits formed therein. Due to the fact that different devices and circuits may be contained in different structures depending on the specific manufacturing processes, the internal structure of the semiconductor substrate 100 is not shown in the drawings of the present invention. However, it shall not be deemed to constitute any limitation to the applicability and scope of the present invention. The semiconductor substrate 100 has a surface layer 110 with a recess 120; the surface layer 110 may be made of a material such as semiconductor, ILD, metal (e.g., W, Cu, Al), silicon oxides, or nitrides, which need to be subjected to a surface planarization process.

Figure 4B:
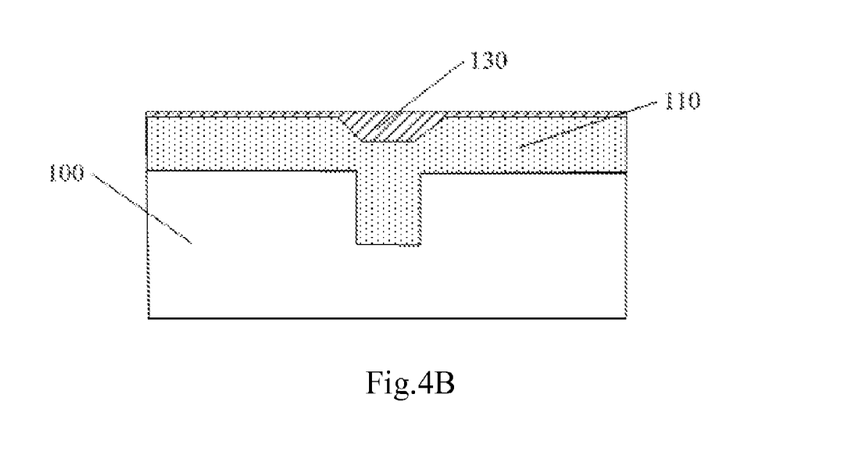

As shown in FIG. 4B, an etching-resist layer 130 is formed over the surface layer 110 to fill the recess 120, resulting in a plane structure without recesses. In order to make the thickness of an etching-resist layer filled in the recess 120 is larger than that outside the recess (i.e., the regions other than the recess on the surface layer 110) on surface layer 110, the present invention employs a PR or BARC layer with good fluidity as the etching-resist layer. A thickness of the etching-resist layer 130 varies along the unevenness of the surface layer when it is filled into the recess 120 due to its good fluidity; therefore, the thickness of the etching-resist layer 130 in the recess is larger than that outside the recess. As a result, a difference between the heights of portions in and outside the recess is reduced greatly or is even eliminated and hence forming a flat surface.

The PR coat is formed by a conventional spin-coating process. A PR layer is coated over the entire surface layer 110; due to the fluidity of PR and the inherent advantages of spin-coating, the resulted PR layer can fill the recess 120; then, a photo-mask is applied on the PR layer to form a PR pattern; then, only a portion of the PR layer corresponding to the recess is left after exposure and development.

If the etching-resist layer is a BARC layer, it can also be formed by the spin-coating process, so as to fill the entire recess 120 and cover the surface layer 110, as shown in FIG. 4B.

Figure 4C:
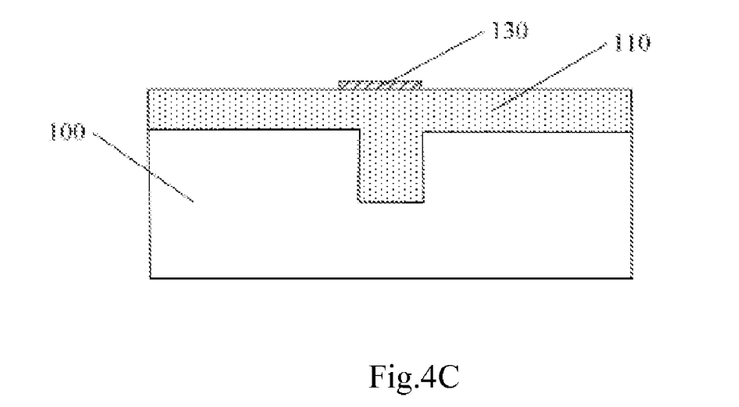

Next, as shown in FIG. 4C, the surface layer 110 and the etching-resist layer 130 are etched, till the surface layer 110 is flush to the bottom of the recess 120 or slightly lower than the bottom of the recess 120; during the etching process, a proper etching gas components should be selected to ensure that the etching speed of the surface layer is higher than that of the etching-resist layer, so that the entire surface layer maintains flat after the etching process for surface layer 110 and etching-resist layer 130, without introducing new recesses. Preferably, the surface layer 110 is flush to the bottom of the recess 120 after the etching process for surface layer 110 and the etching-resist layer 130.

In the present invention, if the etching-resist layer 130 is a PR layer, the consumption of PR during the etching process can be neglected, since the thickness of PR is adjustable and the conventional etching gases has little etching effect on the PR. Therefore, a proper etching gas can be selected in accordance with the material of surface layer 110. Depending on the material of the surface layer, a conventional etching gas is also possible. Therefore, the description thereof is omitted here. For example, if the surface layer 110 is a silicon oxide layer, then CF4 or the like can be used as the etching gas.

If the etching-resist layer 130 is a BARC layer, a proper etching gas shall be chosen to ensure that the etching speed of the BARC layer is lower than that of the surface layer. However, a conventional etching gas is also possible. For example, if the surface layer is a silicon oxide layer, an etching gas including at least one of CxFy ($1 \leq X \leq 9$, $1 \leq Y \leq 9$) and CHxFy ($1 \leq X \leq 9$, $1 \leq Y \leq 9$) can be used.

Figure 4D:
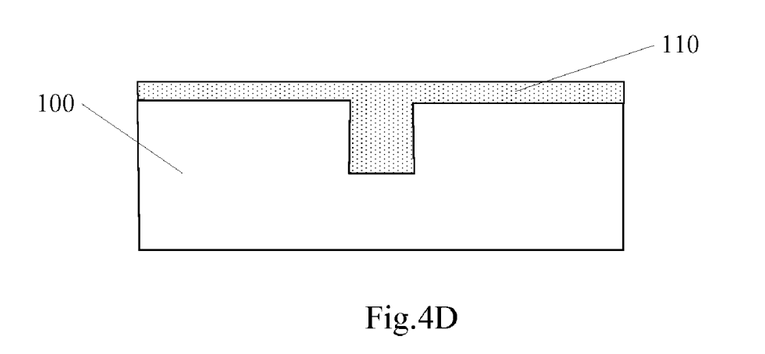

Finally, as shown in FIG. 4D, the etching-resist layer 130 is removed. If the etching-resist layer 130 is a PR layer, the etching-resist layer can be removed by a conventional process for removing PR, such as an ashing process. If the etching-resist layer 130 is a BARC layer, the etching-resist layer 130 can also be removed by a conventional process, such as an ashing process.

Embodiment 2

The present invention also provides a method for planarization of a top metal layer in LCOS, wherein the top metal layer is contained in a wafer and includes a trench and an insulating oxide layer including a recess formed over the trench and the top metal layer, a position of the recess in the insulating oxide layer corresponding to the trench; the method comprises the following steps: forming an etching-resist layer over the insulating oxide layer to fill the recess, the thickness of the etching-resist layer in the recess being larger than that outside the recess; etching the etching-resist layer and the insulating oxide layer, wherein the etching speed of the insulating oxide layer is higher than that of the etching-resist layer, so that the insulating oxide layer outside the recess will not be higher than the bottom of the recess; removing the etching-resist layer; and etching the insulating oxide layer till the top metal layer is exposed completely.

Figure 5A:
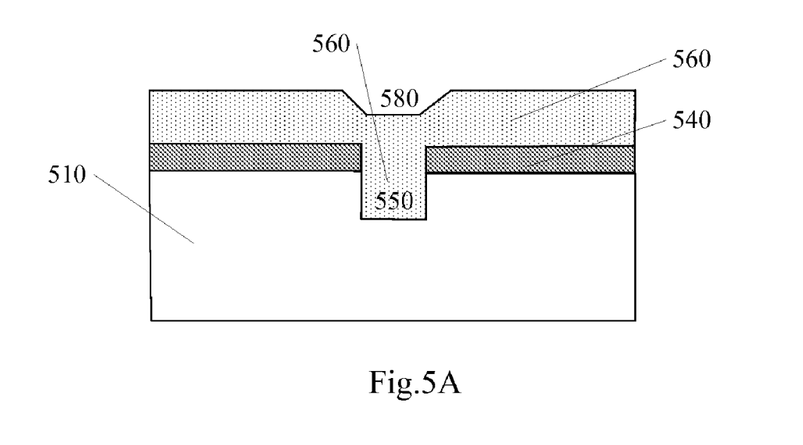
FIG. 5A-5D are schematic cross-section diagrams of the wafer during the planarization process for the top metal layer in LCOS according to the present invention.

As shown in FIG. 5A, a wafer including devices and circuits (not shown) is provided for the process in LCOS fabrication, which has at least two metal wiring layers. A sectional view of the wafer is shown in FIG. 5A, in which reference number 510 represents an ILD layer. A top metal layer 540 is formed on the ILD layer 510. A trench 550 extending through the top metal layer 540 and to a certain depth in the ILD layer 510 is formed and an insulating oxide layer 560 with recess 580 is filled over the trench 550 and the top metal layer 540, the position of the recess 580 corresponding to the trench 550.

The top metal layer 540 may be made of Al, copper (Cu), or silver (Ag); and Al is preferable for the top metal layer due to a higher reflectivity and a lower price.

The ILD layer 510 and insulating oxide layer 560 are made of one selected from a group consisting of silicon oxide, oxynitride, TEOS, ONO, and any other high K-value insulating material with dielectric constant higher than that of silicon oxide.

Figure 5B:
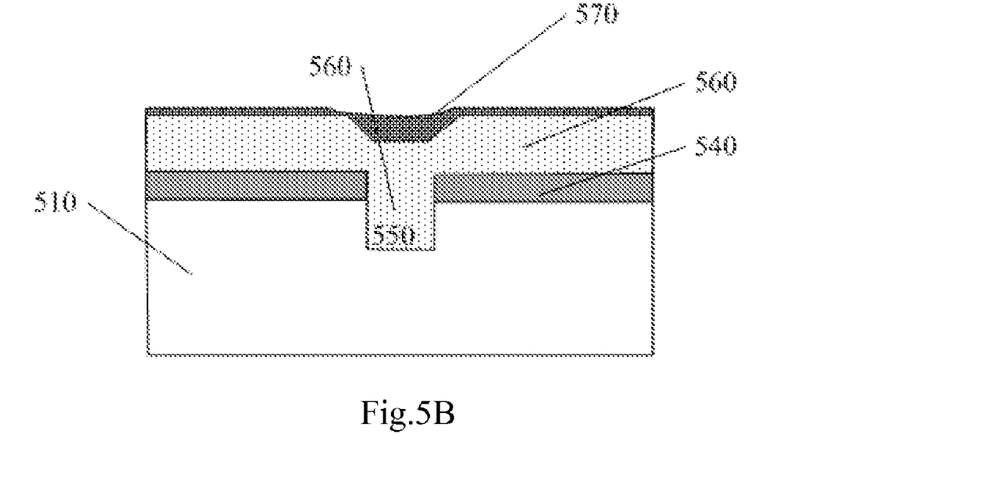

As shown in FIG. 5B, an etching-resist layer 570 is formed over an insulating oxide layer 560 to fill the recess 580, and the thickness of the etching-resist layer 570 in the recess is larger than that outside the recess; preferably, the etching-resist layer 570 forms a plane structure without recess. In the present invention, a PR or BARC layer is used as the etching-resist layer. A thickness of the etching-resist layer 570 varies along with the unevenness of the surface layer when the etching-resist is filled into the recess 580 due to its good fluidity; therefore, a thickness of the etching-resist layer 570 in the recess region is larger than that outside the recess. As a result, the difference between the heights of the etching-resist layer 570 in and outside the recess is reduced greatly or is even eliminated and hence forming a flat surface. The formation of the BARC and PR layer is described in the first embodiment.

Figure 5C:
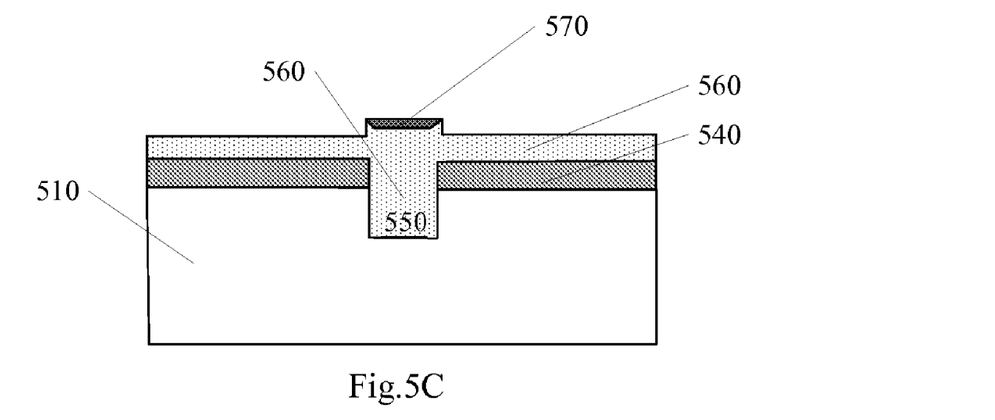

Next, as shown in FIG. 5C, the insulating oxide layer 560 and the etching-resist layer 570 are etched, till the insulating oxide layer 560 is flush to the bottom of recess 580, or slightly lower than the bottom of recess 580.

In the present invention, if the etching-resist layer 570 is a PR layer, a conventional etching gas well-known to those skilled in the art can be used to etch the insulating oxide layer 560 by a dry etching. If the etching-resist layer 570 is a BARC layer, an etching gas including at least one of CxFy ($1 \leq X \leq 9$, $1 \leq Y \leq 9$), CHxFy ($1 \leq X \leq 9$, $1 \leq Y \leq 9$), Ar, and $O_2$ can be used, and the mixing ratio of the etching gases can be adjusted, so that the etching rate of the insulating oxide layer 560 is higher than that of the etching-resist layer 570. The insulating oxide layer 560 is etched, till it is flush to or slightly lower than the bottom of the recess 580. Preferably, the insulating oxide layer 560 is flush to the bottom of the recess 580.

Figure 5D:
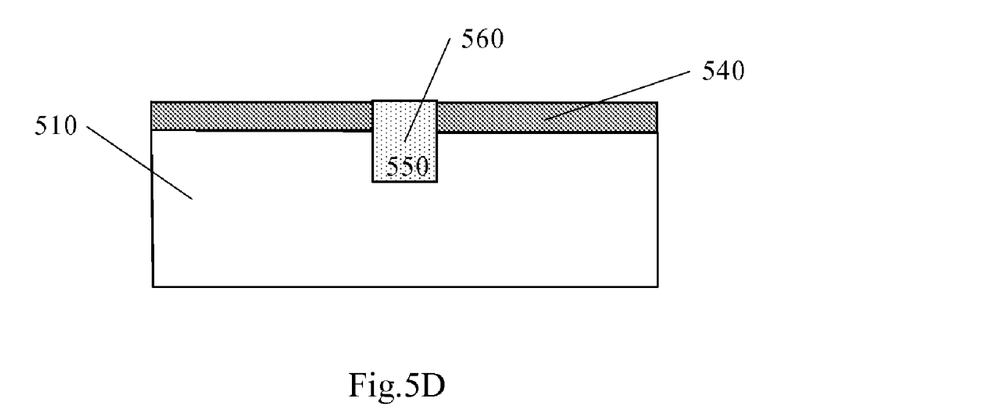

Finally, as shown in FIG. 5D, the etching-resist layer 570 is removed. The process for removing the etching-resist layer is described in the first embodiment. After the etching-resist layer 570 is removed, the insulating oxide layer 560 is further etched, till the top metal layer 540 is exposed completely.

The top metal layer 540 mentioned above has a flat surface after the planarization. Therefore, the concentric ring recesses on the top metal layer 540, resulted from etching the insulating oxide layer 560 after the CMP process for polishing the insulating oxide layer 560 in the prior art, can be avoided.

Embodiment 3

The present invention also provides a method for planarization of a top metal layer in LCOS, wherein a wafer having an ILD layer and a top metal layer formed over the ILD layer is provided, the method comprising the following steps: etching the top metal layer and the ILD layer to a predetermined depth, to form a trench in the top metal layer and the ILD layer; forming an insulating oxide layer over the top metal layer and the trench so as to fill the trench, the insulating oxide layer having a recess at a position corresponding to the trench; forming an etching-resist layer over the insulating oxide layer to fill the recess, and a thickness of the etching-resist layer in the recess is larger than that outside the recess; etching the etching-resist layer and the insulating oxide layer, the etching speed of the insulating oxide layer being higher than that of the etching-resist layer, so that the insulating oxide layer outside the recess will not be higher than the bottom of the recess; removing the etching-resist layer; and etching the insulating oxide layer till the top metal layer is exposed completely.

Figure 6A:
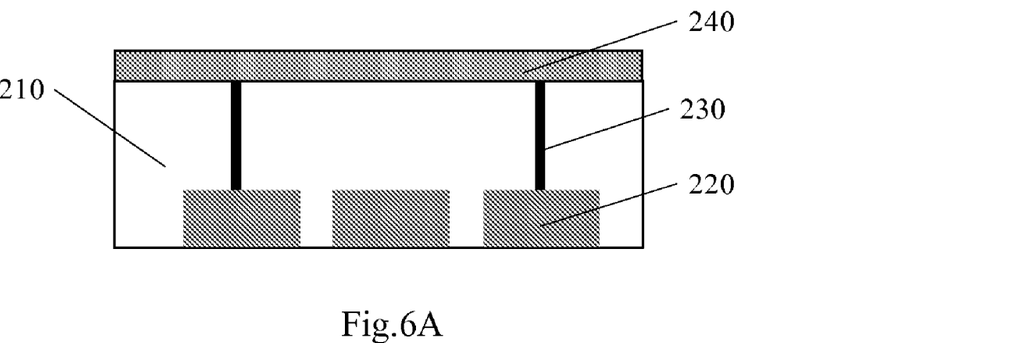
FIG. 6A-6G are schematic cross-section diagrams showing a method for isolating the top metal layer in LCOS according to an embodiment in the invention in the case that the etching-resist layer is a PR layer.

As shown in FIG. 6A, a wafer including devices and circuits (not shown) is provided for the process in LCOS fabrication, which has at least two metal wiring layers. A sectional view of the wafer is shown in FIG. 6A in which reference number 210 represents an ILD layer. A top metal layer 240 is formed on the ILD layer 210 and the ILD layer 210 has an intermediate metal layer 220 and a metal contact hole 230 connecting the intermediate metal layer 220 with the top metal layer 240. In LCOS, the top metal layer 240 is used as a mirror, which reflects optical signals through the liquid crystal to the screen. In post-process for LCOS, a top metal layer 240 needs to be isolated into several small mirrors, each of which acts as a pixel unit. A number of pixel units present a complete image on the screen.

In the present invention, the top metal layer 240 can be made of one of Al, Cu and Ag. Al is preferred for the top metal layer due to its higher reflectivity and lower price.

The ILD layer 210 is made of one of silicon oxide, oxynitride, TEOS, ONO, and any other high K-value insulating material with dielectric constant higher than that of silicon oxide. The intermediate metal layer 220 may comprise any conventional inter-layer metal, such as Al, Cu or the like; the metal contact hole 230 may be made of one of Cu, Al, W, or any other metal suitable for the contact hole.

Figure 6B:
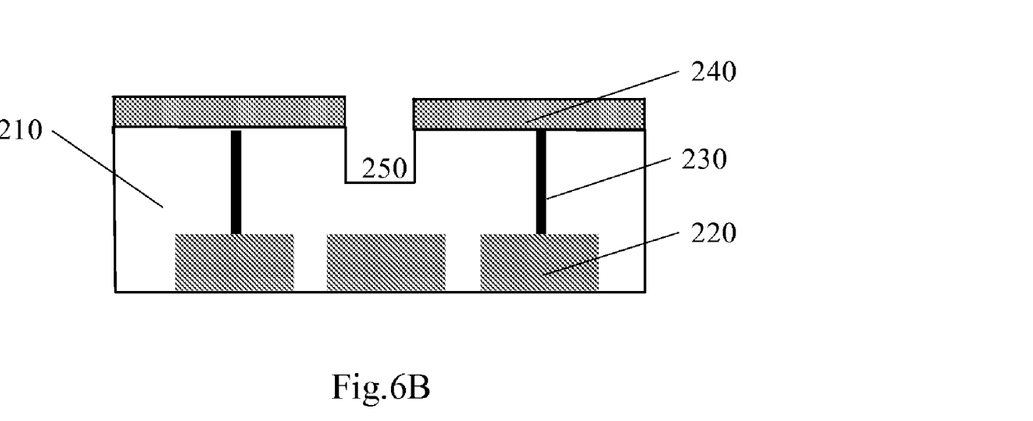

As shown in FIG. 6B, the top metal layer 240 and ILD layer 210 are etched to a certain depth to form a trench 250. Preferably, the top metal layer 240 and ILD layer 210 are etched by a dry etching process.

Figure 6C:
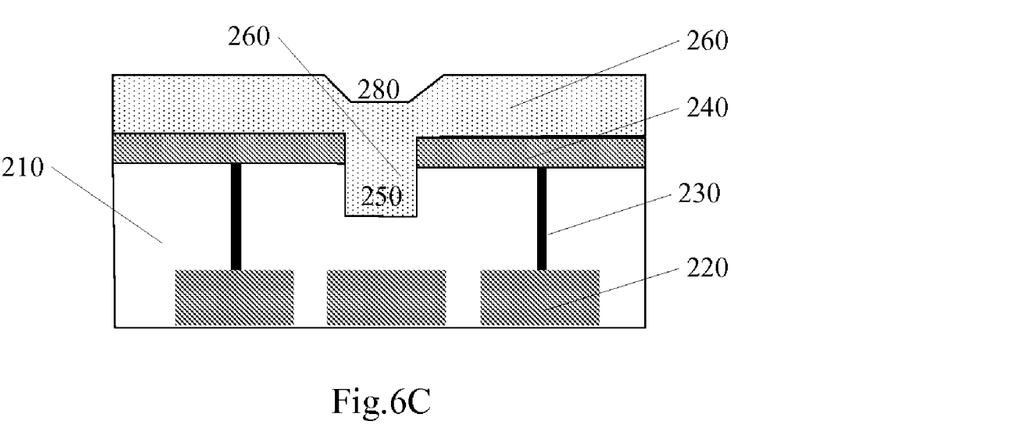
Figure 7:
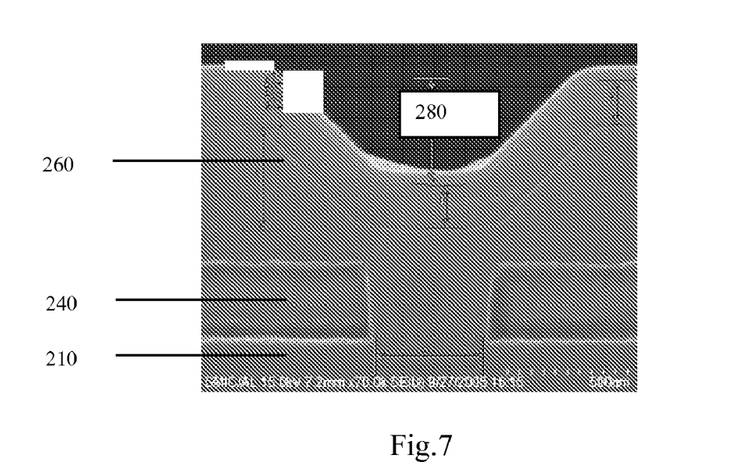
FIG. 7 is a SEM (Scanning Electron Microscope) image of the insulating oxide layer formed on the top metal layer with recesses according to the third embodiment in the present invention.

Next, as shown in FIG. 6C, an insulating oxide layer 260 is formed over the trench 250 and the top metal layer 240, so as to fill the trench 250. The insulating oxide layer 260 is made of an insulating material, such as silicon oxide, oxynitride, TEOS, or ONO or the like. The insulating oxide layer 260 is formed by, for example, a CVD (chemical vapor deposition) process, preferably a PECVD (plasma enhanced chemical vapor deposition) process. The CVD process is well-known to those skilled in the art, and therefore a description thereof is omitted. After the insulating oxide layer 260 is formed over the trench 250 and the top metal layer 240 by a CVD process, a recess 280 is formed on the insulating oxide layer 260 at a position corresponding to the trench 250. FIG. 7 shows a SEM image of the recess 280 formed on the insulating oxide layer 260 at a position corresponding to the trench 250 in the fabrication of the LCOS.

Figure 6D:
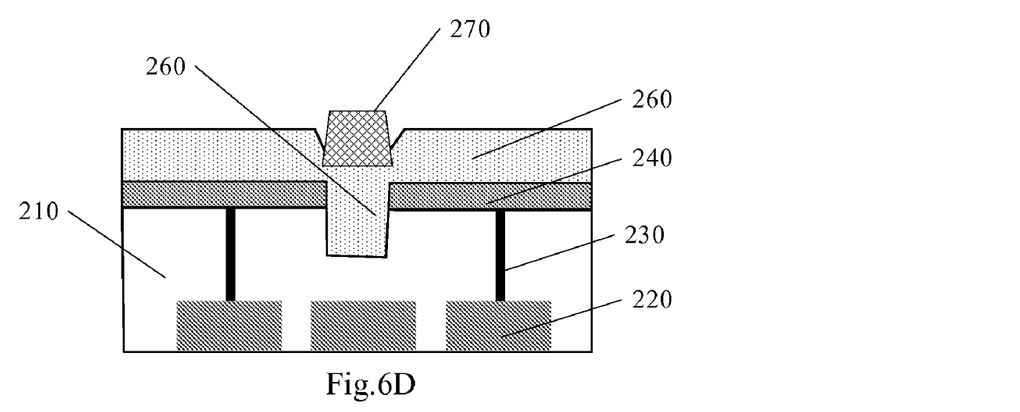

As shown in FIG. 6D, an etching-resist layer 270 is formed on the insulating oxide layer 260 to fill the recess 280, so that a thickness of the etching-resist layer 270 in the recess is larger than that outside the recess; preferably, the etching-resist layer 270 forms a plane structure without recesses. In order to fill the entire recess 280 completely with the etching-resist, a PR with fluidity is used as the etching-resist layer in this embodiment. The PR layer is coated over the insulating oxide layer 260 by a conventional spin-coating process; due to the fluidity of PR and the inherent advantages of the spin-coating process, a thickness of the etching-resist layer 270 varies along with the unevenness of the surface layer when the etching-resist is filled into the recess 280. Therefore, a thickness of the etching-resist layer 270 in the recess is larger than that outside the recess. As the result, the difference between the heights of the etching-resist layer in and outside the recess is reduced greatly or is even eliminated and hence forming a flat surface. Next, a photo-mask is applied on the PR layer to form a PR pattern, and only the PR in the recess 280 is left by exposure and development, hence forming the structure shown in FIG. 6D.

Figure 6E:
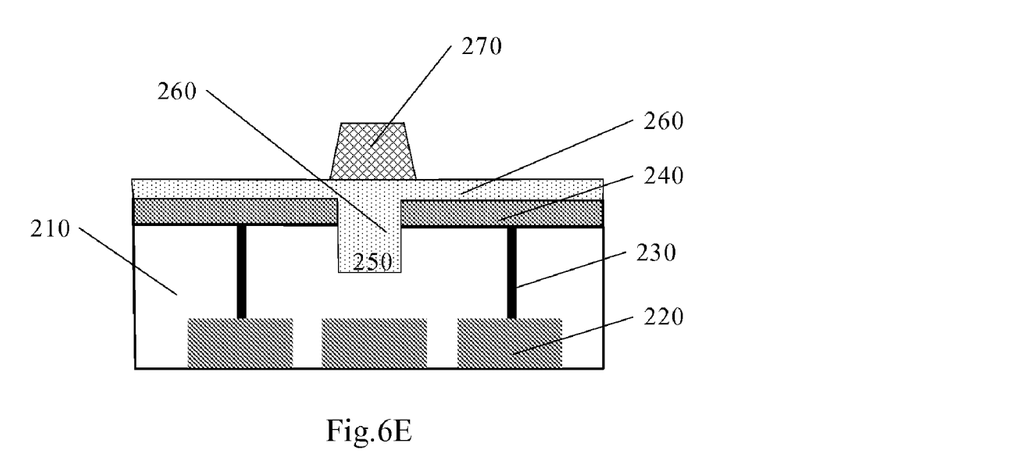

Next, as shown in FIG. 6E, the insulating oxide layer 260 and etching-resist layer 270 are etched. Since the etching-resist layer 270 includes PR and the etching effect of any conventional etching gas to PR can be neglected, an conventional etching process effective to the insulating oxide layer 260 can be selected to etch the insulating oxide layer 260, till the insulating oxide layer 260 is flush to or slightly lower than the bottom of the recess 280.

Figure 6F:
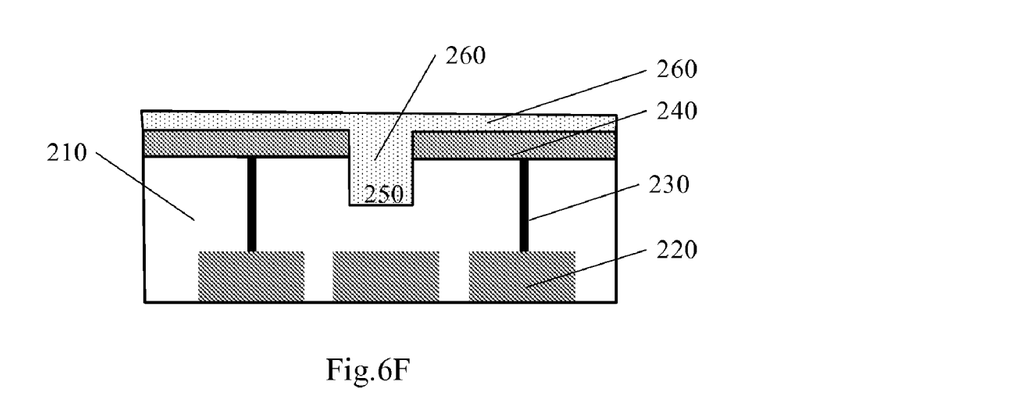

Preferably, the insulating oxide layer 260 is etched by a dry etching process in this embodiment. As shown in FIG. 6F, the etching-resist layer 270 is removed by a conventional ashing process.

Figure 6G:
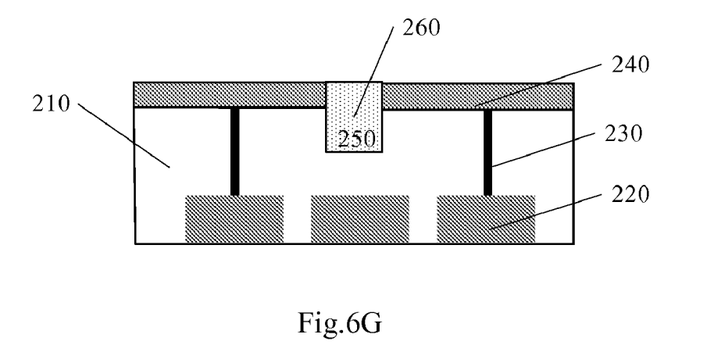
Figure 8:
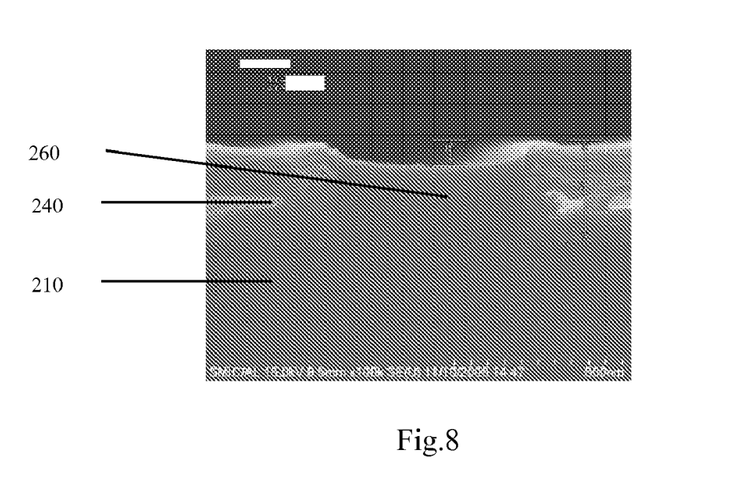
FIG. 8 is a SEM image of the wafer after the etching-resist layer is removed in the third embodiment in the present invention.

Finally, as shown in FIG. 6G, the insulating oxide layer 260 is further etched, till the top metal layer 240 is exposed completely. The process for etching the insulating oxide layer 260 is identical to that described in other steps of the embodiment. FIG. 8 shows a SEM image of the isolation structure in the top metal layer formed by the above method. The top metal layer 240 has a flat surface structure. Since the isolation structure of top metal layer 240 formed by a embodiment of the invention can avoid concentric ring recesses on the top metal layer 240 generated during planarization of the insulating oxide layer 260 by a CMP process in the prior art, the top metal layer formed in the embodiment has a flat surface suitable for optical applications.

Embodiment 4

Figure 9A:
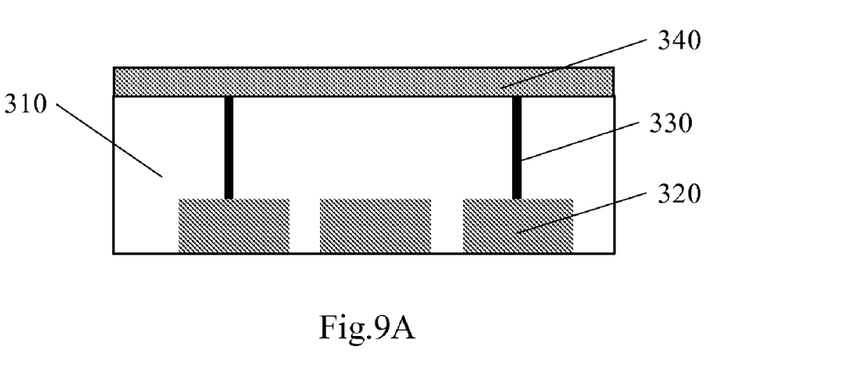
FIG. 9A-9G are structural diagrams showing the process according to the fourth embodiment in the present invention.

As shown in FIG. 9A, a wafer including devices and circuits (not shown) is provided for the process in LCOS fabrication, which has at least two metal wiring layers. A sectional view of a part of the wafer is shown in FIG. 9A in which reference number 310 represents an ILD layer. A top metal layer 340 is formed on a surface of the ILD layer 310. The ILD layer 310 has an intermediate metal layer 320 and a metal contact hole 330 connecting the intermediate metal layer 320 and the top metal layer 340. In LCOS, the top metal layer 340 is used as a mirror, which reflects optical signals to a screen through a liquid crystal. In post-processes for LCOS, a top metal layer 340 needs to be isolated into several small mirrors, each of which acts as a pixel unit. A number of pixel units present a complete image on the screen.

In the present invention, the top metal layer 340 can be made of one of Al, Cu, or Ag. Al is preferred for the top metal layer due to its higher reflectivity and lower price.

The ILD layer 310 is made of one of silicon oxide, oxynitride, TEOS, ONO, or any other high K-value insulating material with dielectric constant higher than that of silicon oxide. The intermediate metal layer 320 may be made of any conventional inter-layer metal, such as Al, Cu or the like. The metal contact hole 330 may be made of one of Cu, Al, W, or any other metal suitable for the contact hole.

Figure 9B:
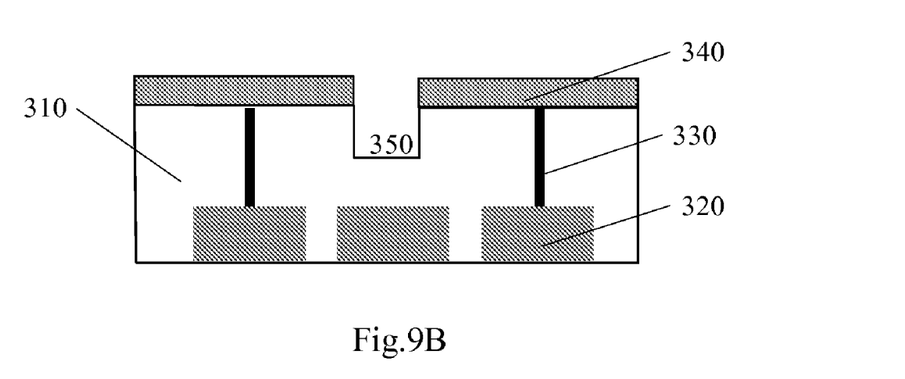

As shown in FIG. 9B, the top metal layer 340 and ILD layer 310 are etched to a certain depth to form trench 350. Wherein, the etching process for the top metal layer 340 and ILD layer 310 is identical to the etching process for the top metal layer 240 and the ILD layer 210 in the third embodiment.

Figure 9C:
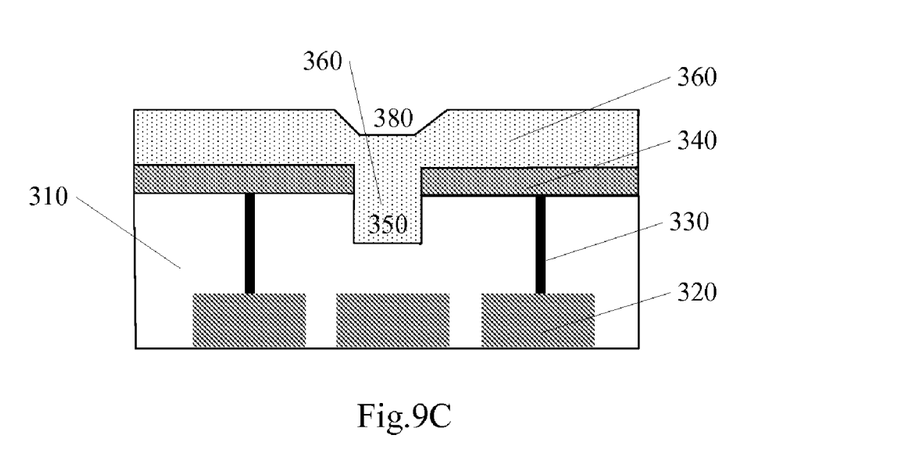

Next, as shown in FIG. 9C, an insulating oxide layer 360 is formed over the trench 350 and the top metal layer 340, so as to fill the trench 350. The insulating oxide layer 360 is made of an insulating material, such as silicon oxide, oxynitride, TEOS, or ONO or the like. The insulating oxide layer 360 is formed by, for example, a CVD process, preferably a PECVD process. After the insulating oxide layer 360 is formed over the trench 350 and the top metal layer 340 by a CVD process, a recess 380 is formed on the insulating oxide layer 360 at a position corresponding to the trench 350.

Figure 9D:
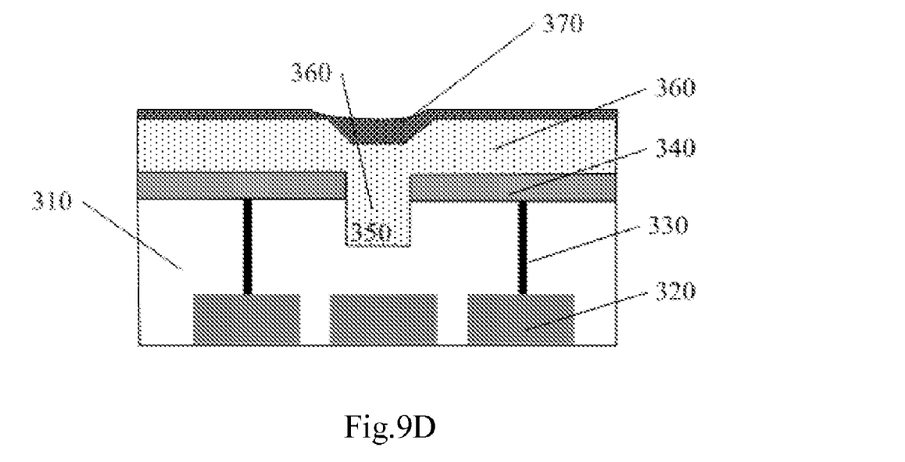
Figure 10:
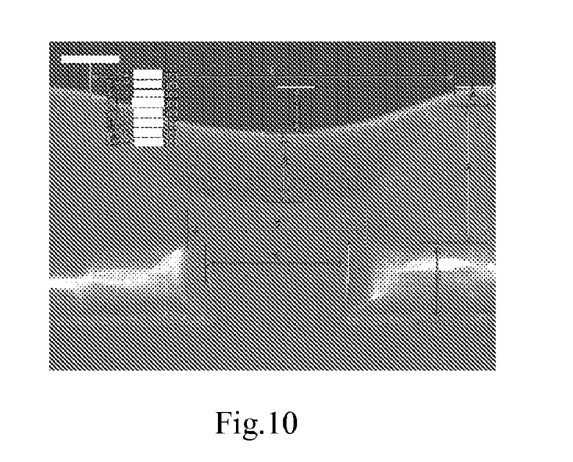
FIG. 10 is a SEM image of the wafer after the recess on the insulating oxide is filled with the etching-resist layer in the fourth embodiment.
Figure 11:
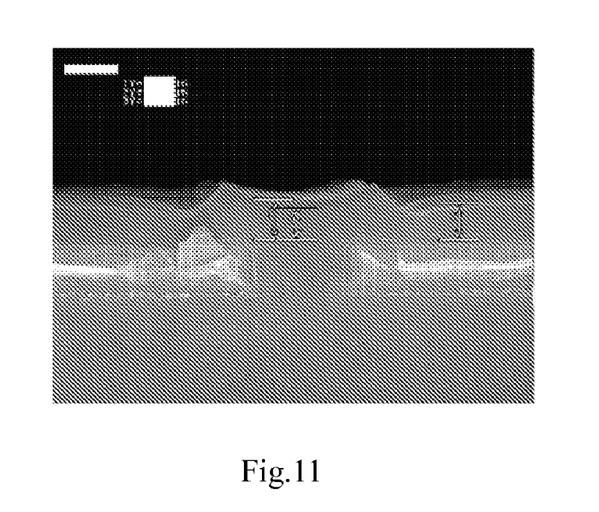
FIG. 11 is a SEM image of the wafer showing an isolation structure for the top metal layer according to the fourth embodiment in the present invention.

As shown in FIG. 9D, an etching-resist layer 370 is formed over the insulating oxide layer 360 to fill the recess 380, so that a thickness of the etching-resist layer 370 in the recess is larger than that outside the recess. Preferably, the etching-resist layer 370 forms a plane structure without recesses. The etching-resist layer 370 is a BARC layer. The BARC layer is coated by a conventional spin-coating process. A thickness of the etching-resist layer 370 varies along with the unevenness of the surface when the etching-resist is filled into the recess 380. Therefore, a thickness of the etching-resist layer 370 in the recess is larger than that outside the recess. As a result, the difference between the heights of portions in and outside the recess is reduced greatly or is even eliminated and hence forming a flat surface. FIG. 10 is a SEM image showing the recess 380 filled with BARC. The ILD layer 310, top metal layer 340 and insulating oxide layer 360 in FIG. 10 correspond to the ILD layer 310, top metal layer 340 and insulating oxide layer 360 in FIG. 9.

Figure 9E:
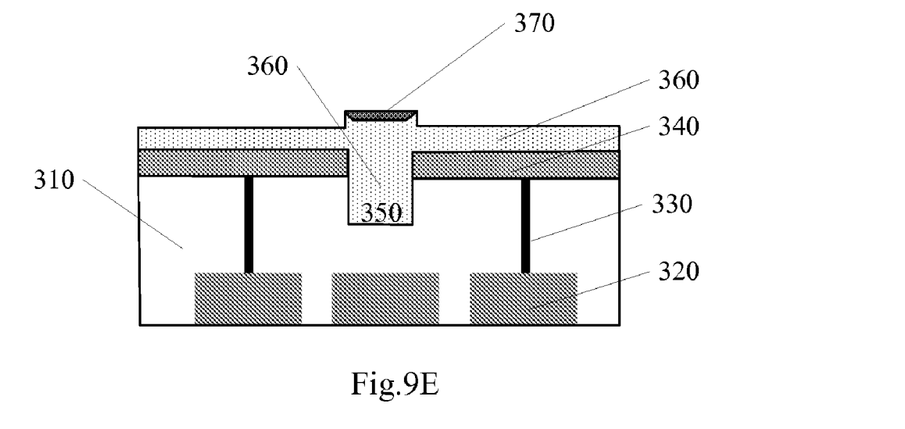

Next, as shown in FIG. 9E, the insulating oxide layer 360 and etching-resist layer 370 are etched, preferably by a conventional dry etching process using CxFy ($1 \leq X \leq 9$, $1 \leq Y \leq 9$), Ar, or O2 as an etching gas in the embodiment. In addition, the mix ratio of the etching gases is adjusted, so that the etching speed of insulating oxide layer 360 is higher than that of etching-resist layer 370, till the insulating oxide layer 360 is flush to or slightly lower than the bottom of the recess 380, preferably, the insulating oxide layer 360 is flush to the bottom of the recess 380 after the etching process.

Figure 9F:
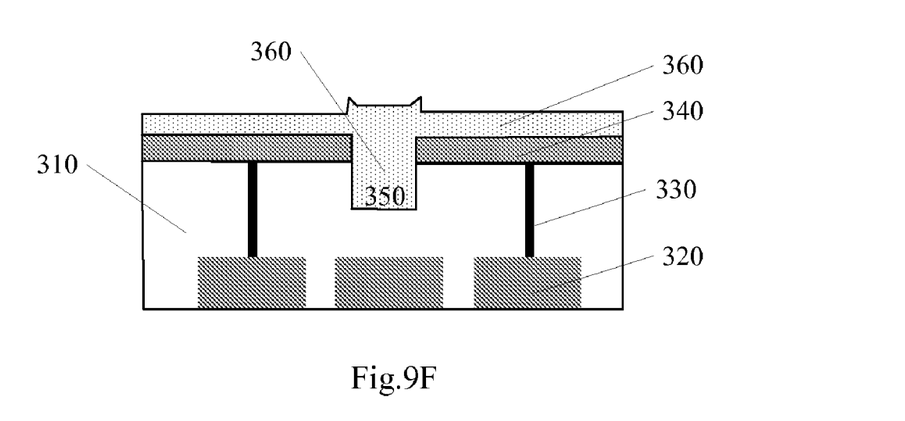

As shown in FIG. 9F, the etching-resist layer 370 is removed. Since the etching-resist layer 370 is a BARC layer, it can be removed by a conventional process, such as ashing.

Figure 9G:
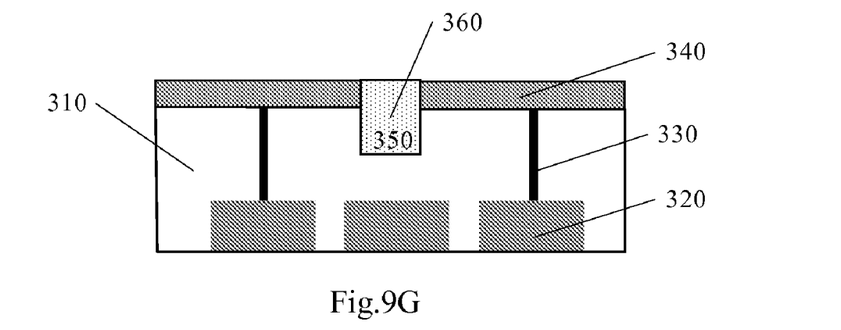

Finally, as shown in FIG. 9G, the insulating oxide layer 360 is further etched, till the top metal layer 340 is exposed completely. The etching process for the insulating oxide layer 360 is identical to the etching process for the etching-resist layer described in other steps of the embodiment. FIG. 12 shows a SEM image of the isolation structure in the top metal layer formed with above method. As shown in FIG. 12, the top metal layer 340 has a flat surface. Since the isolation structure of the top metal layer 340 formed by an embodiment of the invention can avoid concentric ring recesses on the top metal layer 340 generated during planarization of the insulating oxide layer 360 by a CMP process in the prior art, the top metal layer formed in the embodiment has a flat surface suitable for optical applications.

While the present invention has been illustrated and described with reference to some preferred embodiments, the present invention is not limited to these. Those skilled in the art should recognize that various variations and modifications can be made without departing from the spirit and scope of the present invention as defined by the accompanying claims.

What is claimed is:

1. A method for planarization of a top metal layer used as a mirror of LCOS on which an insulating oxide layer having a recess is formed, comprising:

forming an etching-resist layer over the insulating oxide layer to fill the recess, the thickness of the etching-resist layer in the recess being larger than that outside the recess;

etching without performing CMP the etching-resist layer and the insulating oxide layer, wherein, the etching speed of the insulating oxide layer is higher than that of the etching-resist layer, so that the insulating oxide layer outside the recess is not higher than the bottom of the recess;

removing the etching-resist layer in the recess; and etching the insulating oxide layer till the top metal layer is exposed completely, wherein the insulating oxide layer is etched till the top metal layer is completely exposed by a dry etching process, for achieving flatness of the top metal layer and avoiding concentric ring recesses caused by CMP on the top metal layer.

2. The method according to claim 1, wherein the etching-resist layer is a photoresist layer.

3. The method according to claim 2, wherein the method further comprises a process of patterning the etching-resist layer after the etching-resist layer is formed on the insulating oxide layer and before the etching-resist layer and the insulating oxide layer are etched, so as to remove the etching-resist layer outside the recess.

4. The method according to claim 1, wherein the etching-resist layer is a Bottom Anti-Reflection Coat layer.

5. The method according to claim 1, wherein the etching-resist layer is formed by a spin-coating process.

6. The method according to claim 1, wherein the top metal layer is an aluminum layer.

7. The method according to claim 1, wherein the insulating oxide layer is made of one selected from a group consisting of silicon oxide, oxynitride, tetraethyl orthosilicate, or oxide-nitride-oxide.

8. The method according to claim 7, wherein the main etching gas for etching the etching-resist layer and the insulating oxide layer comprises at least one of $C_xF_y$ and $CH_xF_y$, wherein $1 \leq X \leq 9$, $1 \leq Y \leq 9$.

9. The method according to claim 1, wherein the etching-resist layer is removed by an ashing process.

10. A method of isolating a top metal layer used as a mirror of LCOS for a wafer having an Inter-Layer Dielectric layer and the top metal layer on the Inter-Layer Dielectric layer, comprising:

etching the top metal layer and the Inter-Layer Dielectric layer to a predetermined depth, so as to form a trench in the top metal layer and the Inter-Layer Dielectric layer;

forming an insulating oxide layer over the top metal layer and the trench to fill the trench, the insulating oxide layer having a recess at a position corresponding to the trench;

forming an etching-resist layer over the insulating oxide layer to fill the recess, the thickness of the etching-resist layer in the recess being larger than that outside the recess;

etching without performing CMP the etching-resist layer and the insulating oxide layer, wherein, the etching speed of the insulating oxide layer is higher than that of the etching-resist layer, so that the insulating oxide layer outside the recess will not be higher than the bottom of the recess;

removing the etching-resist layer in the recess; and etching the insulating oxide layer, till the top metal layer is exposed completely, wherein the insulating oxide layer is etched till the top metal layer is exposed completely by a dry etching process, for achieving flatness of the top metal layer and avoiding concentric ring recesses caused by CMP on the top metal layer.

11. The method according to claim 10 wherein the etching-resist layer is a photoresist layer.

12. The method according to claim 11, wherein the method further comprises a process of patterning the etching-resist layer after the etching-resist layer is formed on the insulating oxide layer and before the etching-resist layer and the insulating oxide layer are etched, so as to remove the etching-resist layer outside the recess.

13. The method according to claim 10, wherein the etching-resist layer is a Bottom Anti-Reflection Coat layer.

14. The method according to claim 10, wherein the etching-resist layer is formed by a spin-coating process.

15. The method according to claim 10, wherein the top metal layer is an aluminum layer.

16. The method according to claim 10, wherein the insulating oxide layer is made of one selected from a group consisting of silicon oxide, oxynitride, tetraethyl orthosilicate and oxide-nitride-oxide.

17. The method according to claim 16, wherein the main etching gas for etching the etching-resist layer and the insulating oxide layer comprises at least one of $C_xF_y$ and $CH_xF_y$, wherein $1 \leq X \leq 9$, $1 \leq Y \leq 9$.

18. The method according to claim 10, wherein the etching-resist layer is removed by an ashing process.

19. The method according to claim 10, wherein the Inter-Layer Dielectric layer is made of one selected from a group consisting of silicon oxide, oxynitride, tetraethyl orthosilicate, oxide-nitride-oxide and any other high K-value insulating material with dielectric constant higher than that of silicon oxide.

* * * * *